United States Patent [19]

Lonn et al.

[11] 4,178,741
[45] Dec. 18, 1979

[54] SAFETY SYSTEM FOR RIDING MOWER

[75] Inventors: Dana R. Lonn, Minneapolis; Melvin H. Jendersee, Apple Valley, both of Minn.

[73] Assignee: The Toro Company, Minneapolis, Minn.

[21] Appl. No.: 934,369

[22] Filed: Aug. 17, 1978

[51] Int. Cl.² ............................................. A01D 75/30
[52] U.S. Cl. ........................................ 56/7; 56/10.2; 56/10.5; 56/DIG. 15
[58] Field of Search ................ 56/6, 7, 10.2, 10.5, 56/10.8, 10.9, DIG. 15, 11.9

[56] References Cited

U.S. PATENT DOCUMENTS

| | | | |
|---|---|---|---|
| 2,913,878 | 11/1959 | Rue | 56/10.9 |
| 3,111,800 | 11/1963 | Quianthy | 56/10.2 |
| 3,229,452 | 1/1966 | Hasenbank | 56/10.5 |
| 3,590,564 | 7/1971 | Clifford | 56/10.2 |
| 3,733,794 | 5/1973 | Allen | 56/10.5 |
| 3,736,729 | 6/1973 | Peterson | 56/10.5 |
| 3,782,084 | 1/1974 | Harkness | 56/10.5 |
| 3,816,985 | 6/1974 | Sorenson et al. | 56/10.9 |
| 3,969,875 | 7/1976 | Nofel | 56/10.2 |
| 3,985,196 | 10/1976 | Deschamps | 56/10.2 |
| 3,992,858 | 11/1976 | Hubbard et al. | 56/10.9 |

Primary Examiner—Russell R. Kinsey
Assistant Examiner—Paul J. Hirsch
Attorney, Agent, or Firm—Dean P. Edmundson

[57] ABSTRACT

An improved riding mower is described of the type having propulsion means, a seat for the operator, and at least one cutting head which is hydraulically driven. The cutting head is controllable between an operating norm and a non-operating norm by means of a hydraulic valve having two moveable spools, and the cutting head is moveable between a cutting position and a transport position by means of a hydraulic cylinder. A solenoid is employed to control one of the moveable spools. A first electrical switch actuated by pressure in the seat, a second electrical switch actuated by the hydraulic cylinder, and a third electrical switch actuated by the second of said spools independently actuate the solenoid in order to stop operation of the cutting head when the operator is out of the seat, when the cutting head is not in cutting position, and when the operator does not desire cutting action.

5 Claims, 4 Drawing Figures

SAFETY SYSTEM FOR RIDING MOWER

BACKGROUND OF THE INVENTION

This invention relates to riding mowers and, more particularly, to safety systems for riding mowers.

Self-propelled riding mowers are becoming more and more popular and in certain areas are a practical necessity, especially for mowing such large areas as golf courses and lawns around commercial and government complexes such as hospitals, schools, parks, etc. Various types of riding mowers are commercially available, including the types having hydraulically driven cutting heads. Such mowers, consequently, have positive cutting action, i.e. it is not necessary for the mower to be moving forward in order for the cutting heads to be turning. This type of device, however, may present many hazardous situations for the operator. For example, if one of the cutting heads should become jammed or clogged with grass the operator, inadvertently or otherwise, may not discontinue hydraulic power to the cutting head while he leaves the seat to unclog the head. Of course, as soon as the cutting head is freed of obstructions it will once again begin operating. This may present a hazardous situation. Also, if the operator raises the cutting head to a transport position without discontinuing power to the head another dangerous situation may be created.

The present invention provides a safety system which makes much safer the operation of a riding mower having hydraulically driven cutting head.

THE PRESENT INVENTION

In accordance with the present invention there is provided an improved riding mower of the type having at least one cutting head, and preferably a plurality, which is hydraulically driven and is moveable between a cutting position and a transport position by means of a hydraulic cylinder. A hydraulic valve is employed to control each cutting head between an operating norm and a non-operating norm. The hydraulic vavle has first and second moveable spools, the first spool is moveable between first and second positions and the second spool is moveable between first, second and third positions.

The safety system employed on such mower comprises an electrical circuit having the following components:
(a) solenoid means which is adapted to move the first spool between its first and second positions;
(b) first electrical switch means actuatable by pressure in the operator's seat and which is adapted to actuate the solenoid means;
(c) second electrical switch means actuatable by the hydraulic cylinder and which is adapted to actuate the solenoid means;
(d) third electrical switch means actuatable by movement of the second spool to its third position and which is adapted to actuate the solenoid means.

Consequently, in order for the cutting head to operate it is necessary for each of the following conditions to be satisfied: (a) there must be pressure in the operator's seat so as to close the first electrical switch, (b) the hydraulic cylinder must be fully extended (i.e. the cutting head must be on the ground) so as to close the second electrical switch, and (c) the second spool must be the third position so as to close the third electrical switch. When any one of the three switches is open the solenoid returns the first spool to its first position and hydraulic power to the cutting head is stopped.

Preferably there are a plurality of cutting heads wherein at least some of the cutting heads are independently controlled by separate safety systems of the invention. It is also preferable to have an electrical delay means operably connected between the first switch (in the operator's seat) and the solenoid so that the solenoid does not stop hydraulic power to the cutting head when the operator is out of the seat for only 1 or 2 seconds (e.g. when the mower is traversing rough ground).

DETAILED DESCRIPTION OF THE INVENTION

The invention is described in more detail hereinafter with reference to the accompanying drawings wherein like reference characters refer to the same parts throughout the several views and in which.

Figure 1:
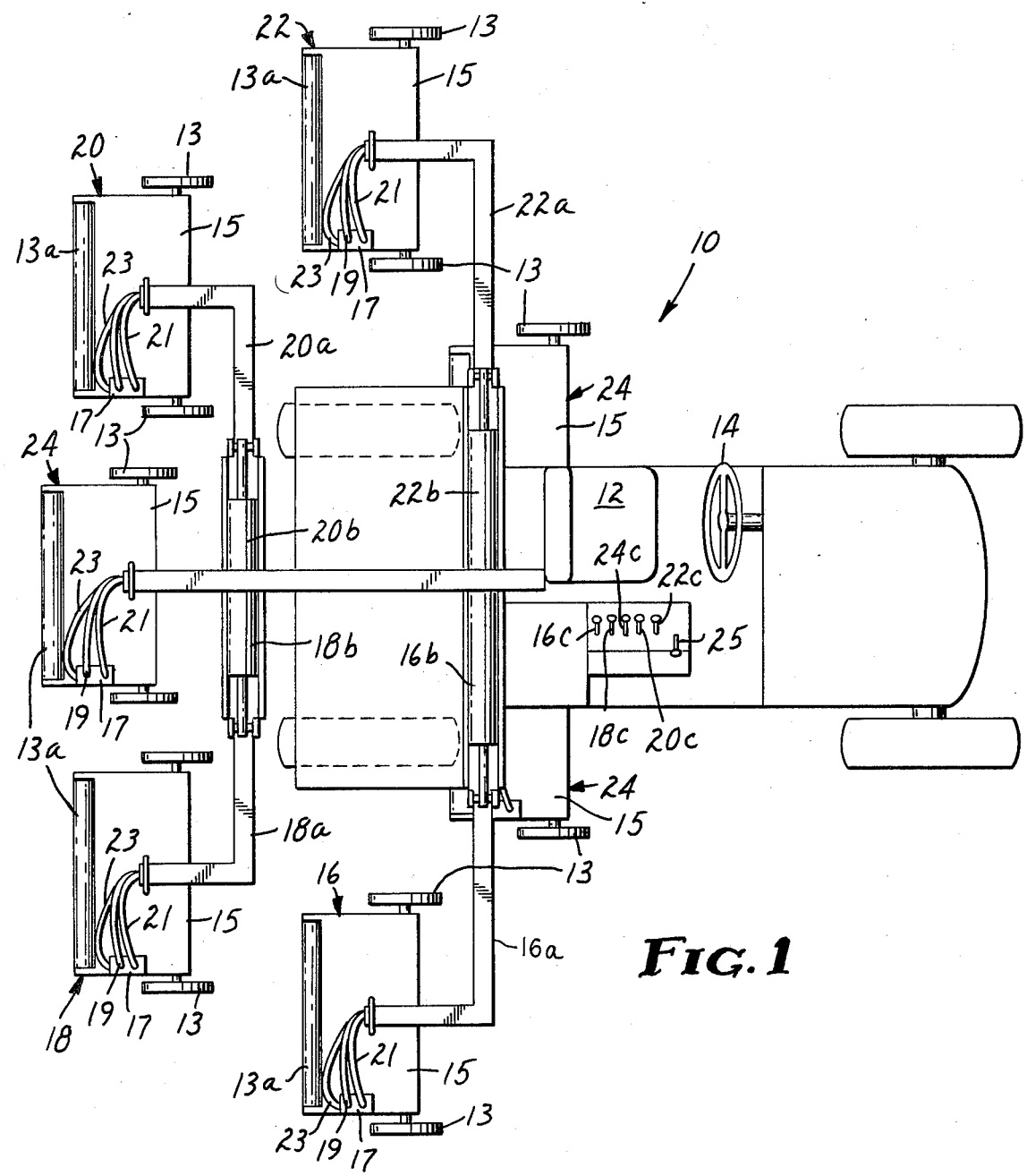
FIG. 1 is a top view of an improved riding mower of the invention.

Referring to FIG. 1 there is shown riding mower 10, which is preferably propelled by a diesel engine, having an operator seat 12 and steering wheel 14. In this embodiment there are seven individual cutting heads. Cutting heads 16, 18, 20 and 22 are each adapted to be operated and controlled independently of all other cutting heads. The three cutting heads which are each designated by the numeral 24 are adapted to be operated and controlled as a collective unit. Each cutting head comprises a reel type cutting unit (not shown) contained within frame means 15 which in operation rolls over the ground on wheels 13 and roller 13a.

Each cutting head is powered by means of hydraulic motor 17 which is operatively connected by means of lines 19, 21 and 23 to a two spooled hydraulic valve (shown in FIG. 4) which in turn is operatively connected to the hydraulic power system of the mower. Cutting heads 16, 18, 20, and 22 are moveable between a cutting position (i.e. cutting heads on the ground) and a transport position (i.e. cutting heads raised either partially or totally) by means of arms 16a, 18a, 20a, and 22a, respectively. These arms are controlled by hydraulic cylinders 16b, 18b, 20b, and 22b, respectively. Cutting heads 24 are all controlled by a single hydraulic cylinder and chain mechanism (not shown).

Hydraulic control levers 16c, 18c, 20c, 22c, and 24c are moveable by the operator of the mower to control movement of the second spool, respectively, in each hydraulic valve (of the type shown in FIG. 4) for the respective cutting heads. Lever 25 is a master control lever to discontinue hydraulic power to all of the cutting heads simultaneously.

Figure 2:
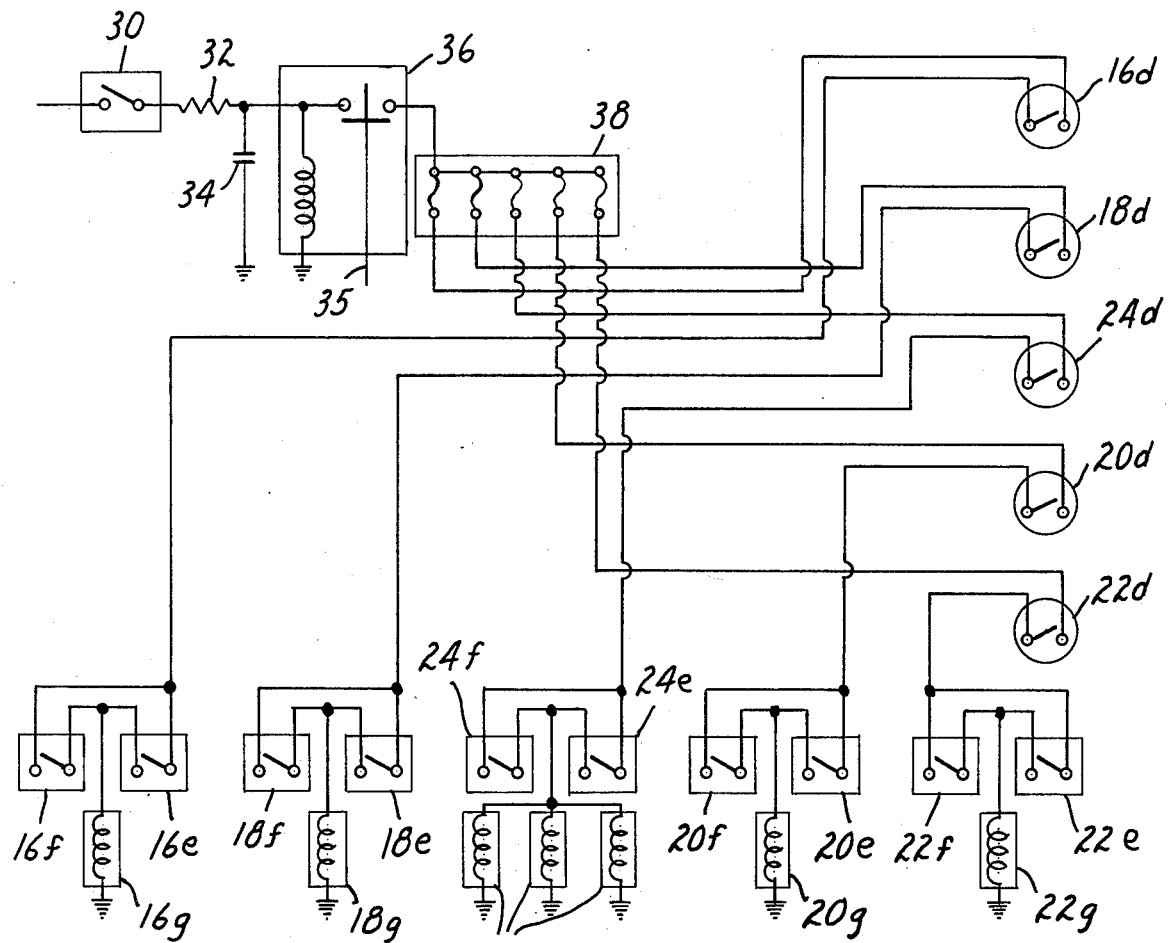
FIG. 2 is a schematic diagram of an electrical safety system employed in the invention.

FIG. 2 is a schematic diagram of an electrical safety system used in the present invention. First electrical switch 30 is a normally open, single pole, single throw switch which is closed only when there is pressure or weight in operator's seat 12. Switch 30 is operatively connected to normally open, continuous duty relay 36. Line 35 goes to the main power supply. Associated with relay 36 is preferably an electrical delay means comprising resistor 32 and capacitor 34. The purpose of such a delay mechanism is to very briefly maintain power in the circuit when there is no pressure or weight in the operator's seat (e.g. when the power is travelling over rough ground and the operator is bouncing in the seat). With a 12 volt DC power system in the mower it has been determined that a 5 ohm resistor and a 6000 to 12,000 microfarad capacitor are sufficient to provide a delay time of approximately 1 to 2 seconds between opening of switch 30 and opening of relay 36.

Figure 4:
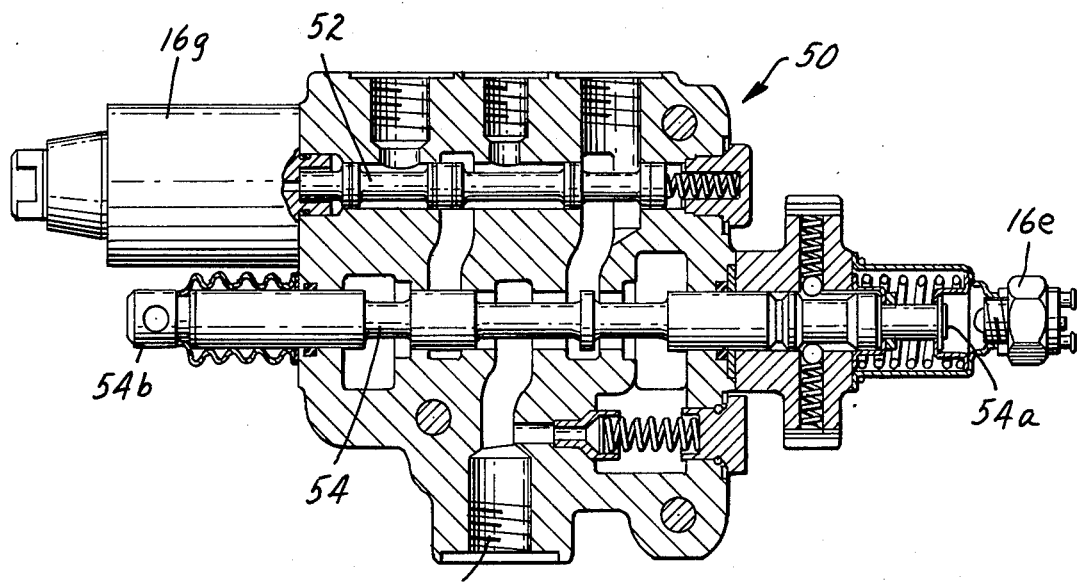
FIG. 4 is a cross-sectional view of a hydraulic valve employed in the mower of FIG. 1.

Relay 36 is operatively connected to fuse block 38 from which individual circuits emanate to control individual hydraulic valves (of the type shown in FIG. 4). Electrical switches 16d, 18d, 20d, 22d and 24d, respectively are normally open, single pole, single throw switches which are closed only when hydraulic cylinders 16b, 18b, 20b, 22b, and the cylinder for heads 24, respectively, are fully extended (i.e. when the respective cutting head is on the ground). Electrical switches 16e, 18e, 20e, 22e and 24e, respectively are also normally open, single pole, single throw switches which are closed only when the second spool of the respective hydraulic valve is in the third position.

Electrical switches 16f, 18f, 20f, 22f and 24f are each utilized when it is desired to turn the reels of the respective cutting heads backward for the purpose of sharpening the blades or declogging the cutting head. These switches are manually closed by the operator at the time desired.

Solenoid means 16g, 18g, 20g, 22g and 24g are energized to move spool 52 to its second position only when switch 30, relay 36, switches 16d, 18d, 20d, 22d and 24d, and switches 16e, 18e, 20e, 22e and 24e 8or 16f, 18f, 22f and 24f) are closed.

Figure 3:
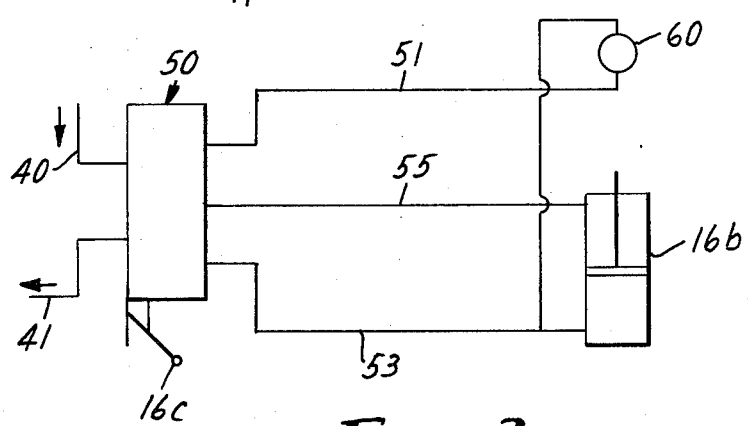
FIG. 3 is a schematic diagram of the hydraulic system for one cutting head employed in the mower of FIG. 1.

In FIG. 3 there is shown a schematic diagram of the hydraulic system employed in the mower of FIG. 1 for each of cutting heads 16, 18, 20, 22, and one of the cutting heads 24. A single hydraulic cylinder is employed for the three cutting heads designated as 24. Although each cutting head 24 is associated with its own separate hydraulic valve (of the type shown in FIG. 4), a single control lever 24c controls the operation of such heads and a single unit.

Thus, in normal operation pressurized hydraulic fluid enters valve 50 by means of line 40. The cutting head is lowered to the ground when spool 52 is in its first position and spool 54 is in its third position. When first spool 52 is in its second (energized) position, and when second spool 54 is in its third (detented) position, and when the hydraulic cylinder 16b is in its fully extended position, pressurized hydraulic fluid flows through line 53 from the valve to hydraulic motor 60 which turns the cutting blades of the cutting head in a cutting direction and returns through the valve through hose 51 and thence to the hydraulic fluid tank via line 41. When raising the cutting head 16 pressurized hydraulic fluid flows through line 55 to the rod side of cylinder 16b an spool 52 is in the first (normal) position and spool 54 is in the first position.

In FIG. 4 there is shown the preferred hydraulic valve 50 employed in conjunction with each of the separately controlled cutting heads 16, 18, 20, 22 and 24. Valve 50 has two moveable spools, a first spool 52 and a second spool 54. Spool 52 is moveable between a first position (i.e. normal; as shown in the drawings, which allows hydraulic fluid to move to or from the hydraulic cylinder 16b an also blocks movement of fluid to and from the hydraulic motor 60) and a second position (i.e. energized; when the spool moves to the right to permit pressurized hydraulic fluid to move to and from hydraulic motor 60 and also blocks movement of fluid to and from the cylinder). Spool 54 is moveable from a first position (where spool 54 shown in FIG. 4 is moved to the left so as to permit pressurized hydraulic fluid to flow from inlet port 58 to the first spool 52) to a second position (as shown in FIG. 4 where pressurized fluid from inlet port 58 flows through valve 50 to line 41) to a third position where spool 54 is moved to the right so that end 54a of spool 54 closes normally open switch 16e and additionally permits pressurized fluid to pass from inlet port 58 through valve 50 to line 53.

Spool 54 is moveable between its first, second and third positions by means of an operator's lever (e.g. 16c) affixed at end 54b of spool 54.

solenoid means 16g is operatively connected to spool 52, as shown in FIG. 4, and is adapted to move spool 52 from its first position to its second position when energized. Solenoid 16g is operatively connected to the electrical circuit associated with a particular hydraulic system for a particular cutting head as shown in FIG. 2.

When it is desired to turn a cutting reel (e.g. in cutting head 16) backward (e.g. to unclog the head or to sharpen the blades) it is necessary to (a) manually close switch 16f, for example, (b) close switch 30 by having the operator in seat 12, and (c) close switch 16d by having cylinder 16b fully extended. Solenoid 16g is thereby energized so as to move spool 52 to its second position. The operator then moves lever 16c so as to move spool 54 to its first position. Hydraulic fluid then flows through valve 50 to line 51, through motor 60, and returns through line 53.

What is claimed is:

1. In a riding mower of the type having propulsion means, a seat for the operator thereof, and at least one cutting head which is hydraulically driven and is controllable between an operating norm and a non-operating norm by means of a hydraulic valve having first and second moveable spools, wherein said first spool is moveable between first and second positions, and wherein said second spool is moveable between first, second and third positions, said cutting head being moveable between a cutting position and a transport position by means of a hydraulic cylinder, wherein the improvement comprises:
   (a) solenoid means adapted to move said first spool between said first and second positions;
   (b) first electrical switch means actuatable by pressure in said seat and which is adapted to actuate said solenoid means;
   (c) second electrical switch means actuatable by said hydraulic cylinder and which is adapted to actuate said solenoid means; and
   (d) third electrical switch means actuatable by movement of said second spool to said third position and which is adapted to actuate said solenoid means.

2. A riding mower in accordance with claim 1, wherein there are a plurality of said cutting heads.

3. A riding mower in accordance with claim 1, wherein an electrical delay means is operably connected between said first electrical switch and said solenoid.

4. A riding mower in accordance with claim 3, wherein said electrical delay means comprises a capacitor connected in parallel with electrical relay means.

5. A riding mower in accordance with claim 1, wherein a fourth electrical switch means is connected in parallel with said third electrical switch means, and wherein said cutting head is adapted to be rotated backwardly when said first spool is in said second position and said second spool is in said first position.

* * * * *